United States Patent [19]
McAlister

[11] 3,848,733
[45] Nov. 19, 1974

[54] ROTARY CONVEYOR

[76] Inventor: Jimmie D. McAlister, Bayard, Iowa 50029

[22] Filed: Feb. 1, 1973

[21] Appl. No.: 328,658

[52] U.S. Cl. ............................... 198/211, 198/144
[51] Int. Cl. ........................................... B65g 29/00
[58] Field of Search ...... 198/211, 144; 37/112, 190, 37/90

[56] References Cited
UNITED STATES PATENTS

| 1,656,501 | 1/1928 | Rienks | 198/211 X |
| 2,568,248 | 9/1951 | Nichols | 198/144 |

*Primary Examiner*—Richard E. Aegerter
*Attorney, Agent, or Firm*—Zarley, McKee & Thomte

[57] ABSTRACT

A rotary conveyor for a rock crushing machine or the like is disclosed comprising a housing rotatably mounted on a support means about a horizontal axis. The housing comprises a peripheral wall having annular side walls extending radially inwardly therefrom. A plurality of storage cells are positioned in the housing which are defined by radially extending walls extending between the side walls of the housing. A selectively movable plate member is positioned in each of the storage cells and is normally positioned adjacent the peripheral wall. The conveyor includes means for moving the plate members radially inwardly in the storage cells to selectively dump the contents therefrom. The plate members are moved radially inwardly by a pair of cam track members positioned adjacent the housing which are adapted to engage arm members extending outwardly from the plate members. A second pair of cam track members are provided for selectively moving the plate members radially outwardly at times. Means is also provided for locking the plate members in a position adjacent the peripheral wall.

10 Claims, 8 Drawing Figures

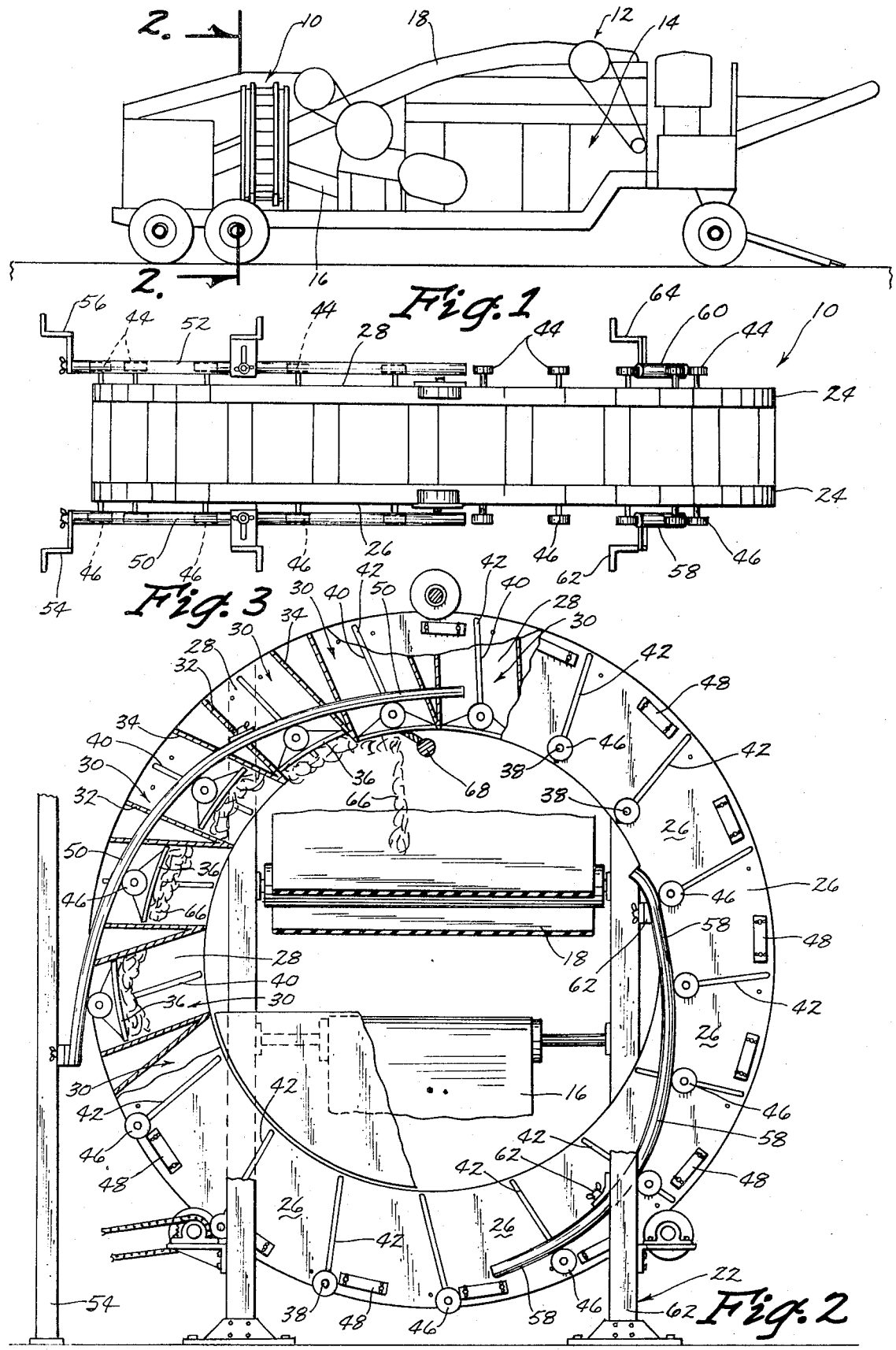

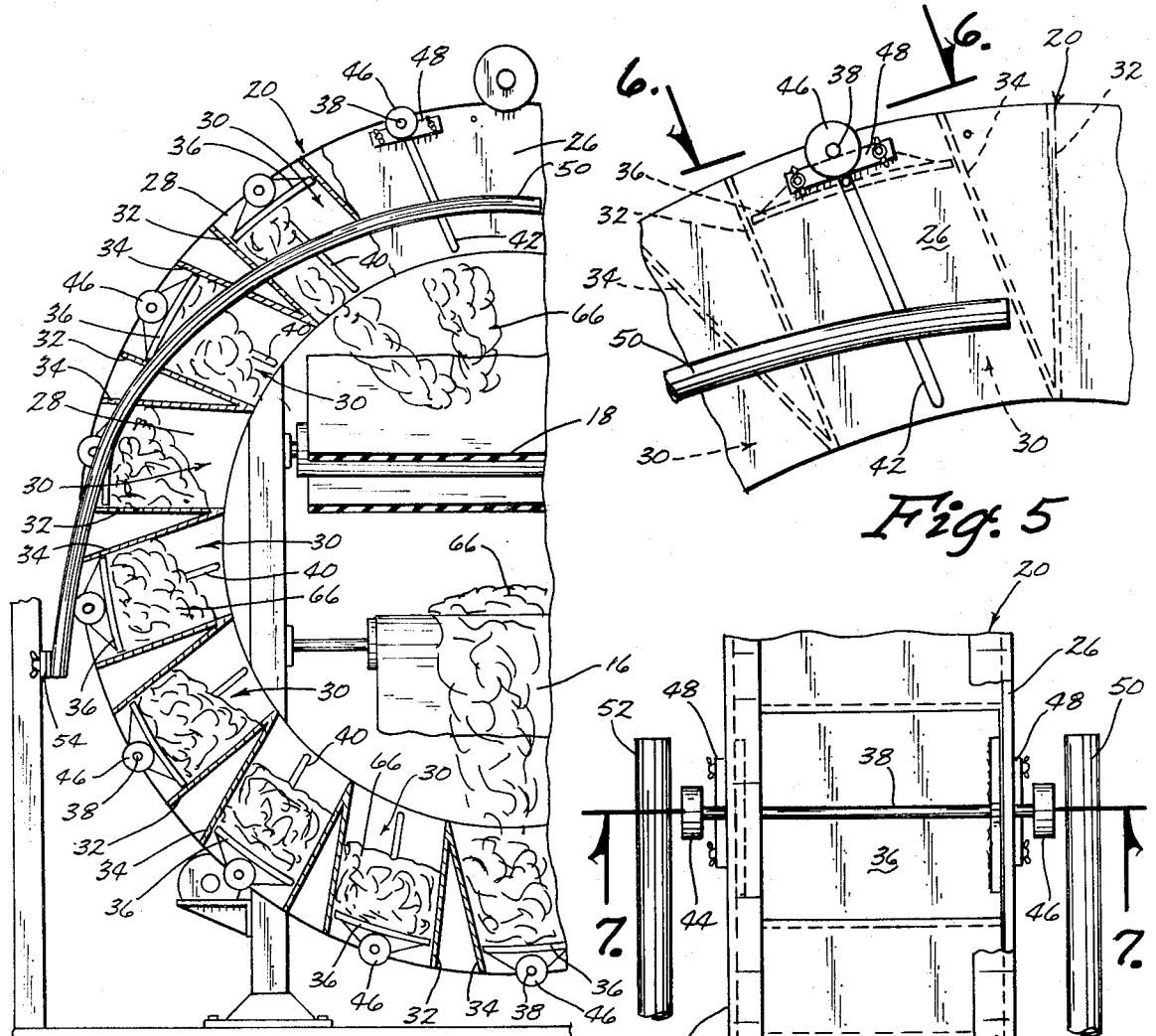
Fig. 4
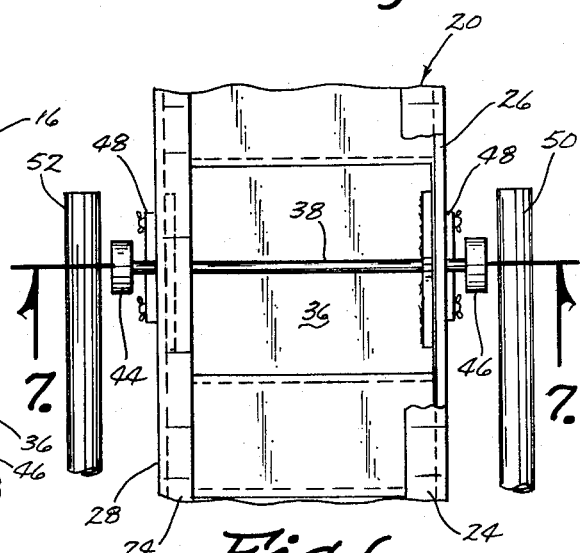
Fig. 5
Fig. 6
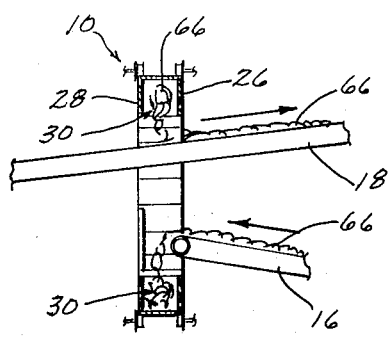
Fig. 8
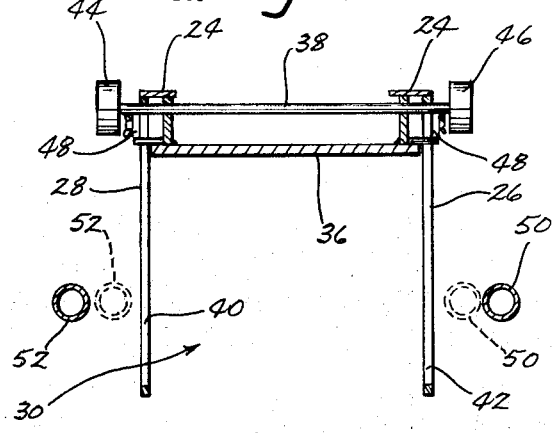
Fig. 7

1

ROTARY CONVEYOR

BACKGROUND OF THE INVENTION

This invention relates to a rotary conveyor and more particularly to a rotary conveyor for a rock crushing machine or the like. Rotary conveyors are used in rock crushing machines to lift or convey sand or the like from a lower conveyor belt onto an upper conveyor belt. In rock crushing operations, the storage cells in the rotary conveyor become plugged which necessitates that the rock crushing operation be stopped to clean the rotary conveyor. The normal method of cleaning the rotary conveyor is to pound on the peripheral and side walls thereof with a hammer or the like in an attempt to loosen the material in the storage cells. This operation must be done periodically and frequently requires an hour or more to accomplish.

Therefore, it is a principal object of the invention to provide a rotary conveyor.

A further object of the invention is to provide a rotary conveyor for a rock crushing machine or the like.

A further object of the invention is to provide a rotary conveyor having means thereon for dumping the contents from the storage cells.

A further object of the invention is to provide a rotary conveyor having means thereon for forcing the packed material from the storage cells.

A further object of the invention is to provide a rotary conveyor comprising a plurality of storage cells having a radially movable plate member in each of the cells thereof together with means for selectively moving the plate members.

A further object of the invention is to provide a rotary conveyor which substantially reduces the time required for cleaning the storage cells.

A still further object of the invention is to provide a rotary conveyor which is economical of manufacture and durable in use. These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a side view of a rock crushing machine having the rotary conveyor of this invention mounted thereon.

FIG. 2 is an enlarged sectional view seen along lines 2—2 of FIG. 1 with portions thereof cut away to more fully illustrate the invention:

FIG. 3 is a top view of the rotary conveyor:

FIG. 4 is a fragmentary view similar to FIG. 2 illustrating the plate members in their normal operative condition:

FIG. 5 is an enlarged side elevational view of a portion of the conveyor:

FIG. 6 is a view seen along lines 6—6 of FIG. 5:

FIG. 7 is a sectional view seen along lines 7—7 of FIG. 6; and

FIG. 8 is a schematic view illustrating the manner in which the rotary conveyor moves material from a lower conveyor belt to an upper conveyor belt.

DESCRIPTION OF THE PREFERRED EMBODIMENT

The numeral 10 refers generally to the rotary conveyor of this invention which is ideally suited for use on a conventional rock crushing machine 12 illustrated in FIG. 1. It should be noted that the rotary conveyor disclosed herein is adapted for use on any apparatus requiring a rotary conveyor such as ditch diggers, etc. Rock crushing machine 12 generally comprises the crushing apparatus 14 and conveyor belts 16 and 18. The rotary conveyor is adapted to convey the material dumped therein by the conveyor belt 16 onto the conveyor belt 18 as will be described in more detail hereinafter.

Rotary conveyor 10 generally comprises a housing 20 rotatably mounted about a horizontal axis on a support means 22 in conventional fashion. Housing 20 comprises a peripheral wall 24 and radially extending side walls 26 and 28. Housing 20 is divided into a plurality of storage cells or compartments 30 by radially extending walls 32 and 34 extending between the side walls 26 and 28.

The numeral 36 refers to a radially movable plate which is mounted in each of the storage cells 30. A shaft 38 is operatively secured to each of the plates 36 and extends outwardly through radially extending slots 40 and 42 formed in the side walls 26 and 28 respectively. The opposite ends of the shaft 38 have rollers 44 and 46 mounted thereon as illustrated in FIG. 7.

The numeral 48 refers to a locking means which is selectively pivotally secured to the side walls 26 and 28 adjacent each of the slots 40 and 42 as illustrated in FIG. 2. The locking means 48 may be pivotally moved from the unlocked position seen in FIG. 2 to the locked position illustrated in FIG. 4 by simply loosening one of the wing bolts and pivoting the same into the movable path of the shaft 38. A pair of cam track members 50 and 52 are positioned on opposite sides of the housing 20 as illustrated in FIGS. 2 and 3 and are selectively movably mounted on supports 54 and 56 respectively to enable the cam track members to be pivotally moved towards the side walls of the housing so as to be in the movable path of the rollers on the outer ends of the shaft 38 at times. A pair of cam track members 58 and 60 are also provided on opposite sides of housing 20 as illustrated in FIGS. 2 and 3 and are selectively pivotally mounted on supports 62 and 64 respectively to enable the cam track members to be pivotally moved towards the side walls of the housing so as to be in the path of the rollers on the opposite ends of the shaft 38.

The normal method of operation is as follows. During normal operation of the conveyor, the locking means 48 on both of the side walls of the housing would be positioned inwardly of the opposite ends of the shaft 38 to maintain the plates 36 adjacent the peripheral wall 24. The cam track members 50, 52, 58 and 60 would be pivotally moved away from the sides of the housing to prevent engagement of the cam track members with the various rollers 44 and 46. The numeral 66 refers generally to sand or the like which is dumped from the rearward end of the conveyor 16 into the storage cells 30 of the rotating rotary conveyor 10. The housing 20 is rotated in a clockwise manner as viewed in FIG. 4 with the sand 66 being dumped from the storage cells 30 when they are approximately positioned over the upper surface of the conveyor 18. This operation is continued until such time as it is desired or necessary to clean the storage compartments or cells 30 of the material which has become lodged therein.

When it is desired to clean the storage cells 30, the cam track members 50, 52, 58 and 60 are pivotally moved towards the housing 20 to the position illustrated in FIG. 3. All of the locking means 48 are then pivotally moved from the position illustrated in FIG. 4 to the position illustrated in FIG. 2 to permit the shafts 38 to move inwardly in their respective slots formed in the side walls of the housing. After all of the locking means 45 have been positioned as illustrated in FIG. 2, the housing 20 is rotated in a clockwise direction which causes the rollers 46 and 48 of each of the shafts 38 to engage the cam track members 50 and 52 respectively. The engagement of the rollers with the cam track members 50 and 52 causes the plates 36 to be progressively moved radially inwardly as seen in FIG. 2 as the storage cell nears the upper surface of the conveyor 18. Each of the plates 36 reach their maximum inward movement as a position over the conveyor 18 and are then scraped by a scraper means 68 to further aid in cleaning the plate 36. After the individual cell 30 has been dumped of its contents, the cell continues in its clockwise rotational manner until the rollers 44 and 46 engage the upper ends of the cam track members 58 and 60. The engagement of the rollers 44 and 46 with the cam track members 58 and 60 causes the plates 36 to be moved radially outwardly in their respective storage cells due to the configuration of the cam track members. When each of the plates 36 have been moved to a position closely adjacent the peripheral wall 24 by the cam track members 58 and 60, the locking means 48 are then repositioned in their locked position to place that particular storage cell in its conveying condition.

Thus it can be seen that a unique rotary conveyor has been provided which has means thereon for cleaning the storage cells therein which eliminates the necessity of pounding on the housing as is customary with present devices. The various cam track members provide the required mechanical force to the plates 36 to dislodge the material in the storage cells and to cause the same to be dumped therefrom onto the conveyor belt 18. Means has also been provided for returning the plates 36 to their normal position after the storage cells have been cleaned. It can be appreciated that the rotary conveyor disclosed herein substantially reduces the amount of time required to clean the storage cells thereof and therefore accomplishes at least all of its stated objectives.

I claim:

1. A rotary conveyor comprising,
a support means,
a housing rotatably mounted on said support means about a horizontal axis
said housing comprising a peripheral wall having annular side walls extending radially inwardly therefrom, a plurality of storage cells in said housing defined by radially extending walls extending between said side walls,
a selectively movable plate member in each of said storage cells and being normally positioned adjacent said peripheral wall,
movable mounting means movably connecting said plate members to said housing whereby said plate members can be moved radially inwardly in their respective storage cells, said movable mounting means comprising an arm means secured to said plate member and extending outwardly through a radially extending slot in said side walls,
and a first and second cam track means each secured to said support means for selective engagement with said arm means as said housing is rotated to cause said plate members to move radially inwardly in their respective storage cells for at least a portion of one revolution of said housing to selectively dump the contents therefrom.

2. The conveyor of claim 1, wherein a third and fourth cam track means are secured to said support means on opposite sides thereof, for selective engagement with said arm means as said housing is rotated to cause said plate members to move radially outwardly in said storage cells for at least a portion of one revolution of said housing after said plate members have been moved radially inwardly in said storage cells.

3. The conveyor of claim 2 wherein said second, third and fourth cam track means comprises selectively movable cam track members positioned on opposite sides of said housing.

4. The conveyor of claim 1 wherein said arm means comprises first and second arm members secured to opposite sides of each of said plate members which extend outwardly through radially extending slots formed in said side walls, said first and second arm members adapted to operatively engage said first and second cam track members to cause said plate members to dump the contents from said storage cells.

5. The conveyor of claim 4 wherein each of said first and second arm members have rollers on the outer ends thereof for engagement with said cam track members.

6. The conveyor of claim 4 wherein said first and second cam track members are selectively movable between operative and inoperative positions.

7. The conveyor of claim 4 wherein a locking means is provided on said side walls to selectively maintain said plate members adjacent said peripheral wall.

8. The conveyor of claim 7 wherein said locking means comprises a selectively pivotal bar means which may be positioned inwardly of said arm members to prevent said plate members from radially moving inwardly in said storage cells.

9. A rotary conveyor comprising,
a support means,
a circular housing rotatably mounted on said support means about a horizontal axis, said housing including a plurality of spaced apart radially extending side walls dividing said housing into a plurality of storage cells, the innermost ends of said storage cells being normally open,
a selectively movable plate member in each of said storage cells and being normally positioned adjacent the outer periphery of said circular housing,
movable mounting means movably connecting said plate members to said housing whereby said plate members can be moved radially inwardly in their respective storage cells,
and means on said housing adjacent the upper portion of said housing for engaging said movable mounting means to move said plate members radially inwardly in said storage cells to dump the contents therefrom as said storage cells approach their uppermost positions of rotational travel.

10. The conveyor of claim 9 wherein means are secured to said housing for selectively locking said plate members adjacent the outer periphery of said circular housing.

* * * * *